Jan. 4, 1949. V. CRONSTEDT 2,458,148
ROTOR CONSTRUCTION FOR TURBINES
Filed Aug. 23, 1944 2 Sheets-Sheet 1

INVENTOR

FIG. 2  INVENTOR

Patented Jan. 4, 1949

2,458,148

UNITED STATES PATENT OFFICE 2,458,148

ROTOR CONSTRUCTION FOR TURBINES

Val Cronstedt, Marlboro, Conn., assignor to United Aircraft Corporation, East Hartford, Conn., a corporation of Delaware Application August 23, 1944, Serial No. 550,880

9 Claims. (Cl. 253—39)

This invention relates to a turbine, compressor, or the like, having a rotor built up of a number of discs clamped together to form a unitary assembly.

Assembly of a built-up turbine or compressor rotor requires very accurate alignment of the discs to preserve balance. An object of the invention is to provide for such alignment by interengaging elements on the adjoining faces of the discs.

It may be necessary to allow for relative radial expansion between adjoining discs because of the different operating temperatures. A feature of the invention is the maintenance of concentricity without preventing this relative expansion.

A feature of the invention is the formation of each disc with projecting flanges having face splines engaging with similar splines on the adjoining disc.

Another feature is the location of these face splines at a point substantially spaced from the center of the rotor to provide stability in bending.

A feature of the invention is that the splines, or other interengaging elements on the discs, by which the concentricity of the discs is maintained, will transmit torque between the discs.

Other objects and advantages will be apparent from the specification and claims, and from the accompanying drawings which illustrate an embodiment of the invention.

Fig. 2 is a fragmentary sectional view on a larger scale, through two of the rotor discs.

Figure 1:
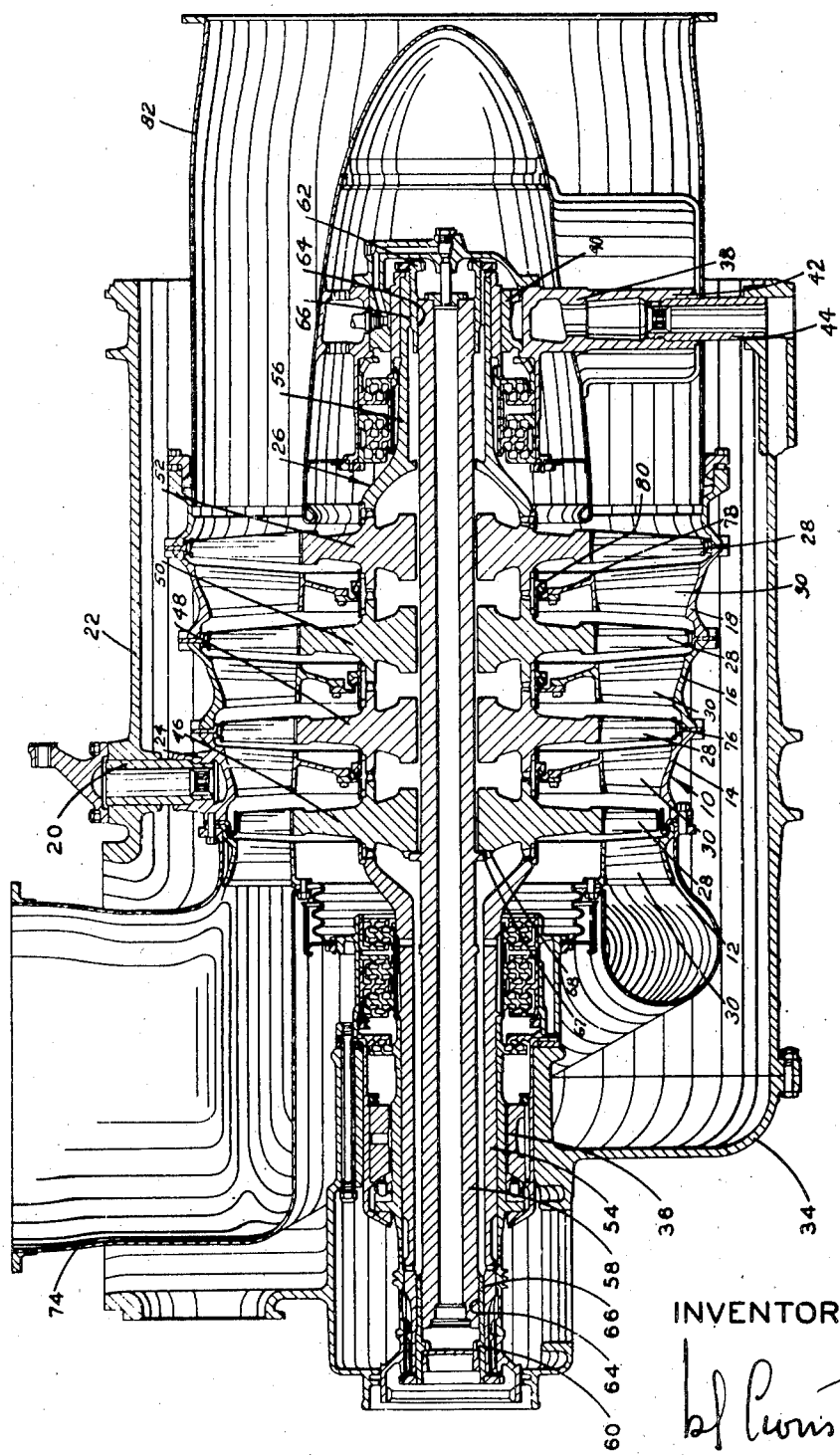
Fig. 1 is a sectional view through a turbine showing one embodiment of the invention.

The invention is shown in connection with a turbine construction which, as will be apparent, is similar in many aspects to the construction of an axial flow compressor.

The turbine shown includes a casing 10 built up of rings 12, 14, 16 and 18, and supported by radial pins 20 in a housing 22. These pins, which are all in the same plane, and which constitute the support for the casing within the housing engage bores in bosses 24 in one ring 14 of the casing. Rotor 26, within the casing, has a number of discs with blades 28 alternating with the rows of nozzles 30 in the casing.

Housing 22 has a head 34 which forms a part of the housing and supports a bearing sleeve 36 for the front end of the rotor 26. At the other end of the turbine, the housing 22 supports a mounting 38 within which is a bearing 40 for the rear end of the rotor. Mounting 38 has a number of legs 42 engaging with radial pins 44 which locate the mounting within the housing.

Rotor 26 is made up of a number of discs 46, 48, 50 and 52, and shaft-forming end bells or elements 54 and 56. The discs and the shaft elements are all held together by a central bolt 58. The ends of the outer ends of the bolt are connected to the end elements by threaded sleeves 60 and 62. Each sleeve 60, 62, has inner threads 64 engaging with cooperating threads on the bolt and outer threads 66 engaging threads on the end elements. On one of the sleeves (sleeve 60 as shown) the inner threads 64 have a greater pitch than the outer threads so that, as the ring is screwed into place, a tension may be applied to the bolt. Rotation of the bolt is prevented during the tightening operation by radially extending lugs 67 engaging slots 68 in one rotor disc.

Except for the connecting threaded sleeves 12 and 62 the end shafts are otherwise spaced from and out of contact with the through bolt, the inner ends of the end shafts flaring out to a diameter substantially the same as that of the flanges 66 and 70.

Since the casing is built up of casing rings, each having a row of nozzles, and bolted together axially, and since the rotor is built up of discs, each having a row of blades, it is apparent that the turbine is adapted for endwise assembly. To assist in aligning the discs during assembly, to prevent relative rotation in operation, and to transmit torque, each disc has projecting annular flanges 69 and 70, Fig. 2, on opposite sides, these flanges having elements preferably in the form of face splines or clutch teeth 72 engaging similar elements on the adjoining disc. Similarly, the inner ends of shaft elements 54 and 56 have face splines engaging with splines 72 on the end discs.

Figure 3:
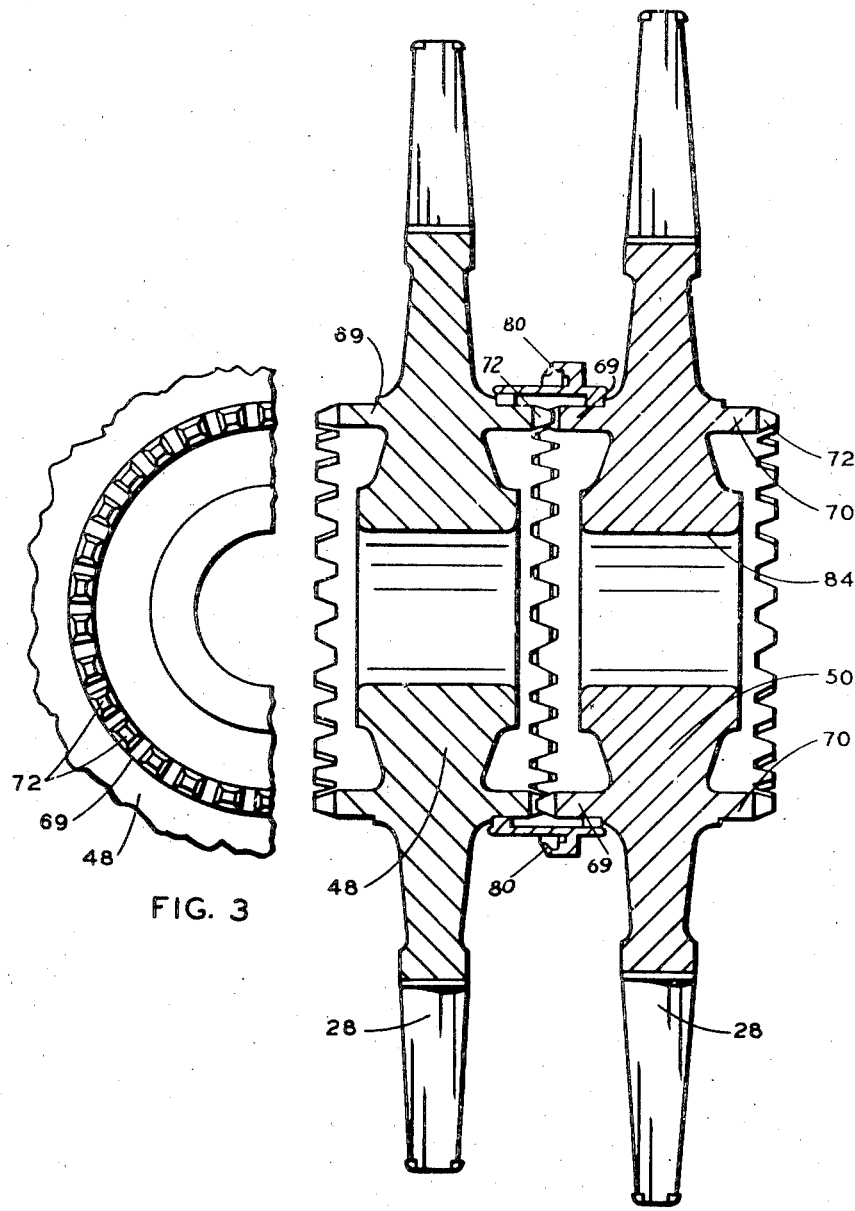
Fig. 3 is a fragmentary end view showing the face splines in greater detail.

The splines, as shown in Figs. 2 and 3, are in the form of bevel gear teeth, the elements of the side surfaces of which are straight. The side surfaces converge toward the tip of the tooth. The dimensions are such that the top surface of the tooth does not engage the base of the groove in which it fits and alignment of adjoining discs is entirely by the side surfaces of the teeth.

The discs and shaft elements of the rotor are free to expand radially without affecting the alignment of the parts. In addition to assuring accurate alignment of the several discs, the face splines or clutch teeth permit radial expansion between adjoining discs and also provide a structure which will permit disassembly of the rotor if desired.

The discs which make up the power section of the turbine rotor have central openings 84 and the shaft elements 54 and 56 have central openings 86 and 88.

Although the invention is shown in connection with a turbine, it will be understood that the invention is equally applicable to axial flow compressors or other similar devices.

It is to be understood that the invention is not limited to the specific embodiment herein illustrated and described, but may be used in other ways without departure from its spirit as defined by the following claims.

I claim:

1. A rotor construction including a number of discs, each having a central opening, said discs having cylindrical flanges on opposite sides engaging with flanges on adjacent discs and interengaging axially extending teeth on said flanges to align the discs, said flanges being spaced from the central openings in the discs, and a through bolt holding said discs together with said interengaging teeth in engagement said through bolt being smaller in diameter than the central openings in the discs and extending therethrough.

2. A turbine rotor including a number of discs each having a central opening, annular flanges on opposite sides of each disc concentric to and spaced from the opening, and interengaging clutch teeth on the ends of the flanges, said teeth projecting axially and having opposite substantially radial surfaces converging toward each other in an axial direction, and a through bolt for holding said interengaging teeth in engagement, said discs being out of engagement with one another except for the interengaging teeth, and said through bolt being smaller than the openings in the discs.

3. A turbine rotor construction including a number of discs, each having a central opening, annular flanges on opposite sides of each disc concentric to and spaced from the opening, and interengaging clutch teeth on the ends of the flanges, said teeth extending axially and having opposite substantially radial surfaces converging toward each other in an axial direction, the radii of the flanges being substantially larger than the openings in the discs and said discs being in contact only where the teeth are in interengagement, end bells at opposite ends of the set of discs and engaging with the flanges on the outermost discs, and a through bolt extending between and engaging said bells and holding said discs together, said bolt having a diameter less than that of the openings in the discs and extending through said openings but out of contact therewith.

4. A rotor construction including a number of discs having interengaging clutch teeth on the adjoining surfaces of the discs, said teeth having opposite side surfaces converging toward the tip of the tooth for aligning the discs, a shaft at least at one end of the discs and engaging the adjacent end disc, and interengaging face splines between the shaft and the end disc, and a through bolt holding said discs and shaft together, said shaft and discs having central openings through which the bolt extends, the bolt being smaller in diameter than the diameter of said central openings in the discs and spaced therefrom.

5. A rotor construction including a number of discs, each having a central opening, said discs having cylindrical flanges on opposite sides engaging with similar flanges on adjacent discs, and interengaging axially extending teeth on said flanges to align the discs, said flanges being spaced from the central openings in the discs, and means for holding said discs together with the teeth in interengagement, said means extending through said central openings and having contact with said discs only through the teeth on the flanges on the outer sides of the end discs.

6. A turbine rotor construction including a number of discs each having a central opening, each of said discs having a row of blades on its periphery extending radially therefrom, said discs having cylindcial flanges on opposite sides engaging with similar flanges on adjacent discs, and interengaging teeth on said flanges to align the discs, said flanges being spaced from the central openings in the discs, and a through bolt holding said discs together with said interengaging teeth in engagement, said through bolt being smaller in diameter than the central opening in the discs and extending through said openings and out of contact therewith.

7. A rotor construction including a number of discs each having a central opening, said discs having cylindrical flanges on opposite sides engaging with similiar flanges on adjacent discs, interengaging teeth on said flanges to align the discs, said flanges being spaced from the central opening in the discs, end bells forming shafts at opposite ends of the set of discs, each end bell having a flange thereon with teeth engaging with the teeth on the flange on the outer side of the adjacent end disc, and a through bolt extending between said end bells for holding said end bells against the discs and for holding the discs together with the teeth in interengagement, said through bolt being smaller in diameter than, and extending through the central openings in the discs, said bolt thereby being out of contact with the discs.

8. A rotor construction including a number of discs each having a central opening, annular flanges on opposite sides of each disc concentric to and spaced from the opening, and interengaging clutch teeth on the ends of the flanges, each of said teeth having its opposite radially extending surfaces converging toward each other in an axial direction, and means extending through said central openings and out of contact therewith for clamping said discs, said means engaging with the sides of the outer discs and spaced from and out of contact with all of the other discs for holding the discs together axially.

9. A rotor construction including a number of discs, each having a central opening, annular flanges on opposite sides of each disc concentric to and spaced from the opening, and interengaging clutch teeth on the ends of the flanges, each of said teeth having its opposite radially extending surfaces converging toward each other in an axial direction, the radii of the flanges being substantially larger than the openings in the discs, and means extending through said central openings and out of contact therewith for clamping said discs, said means engaging with the sides of the outer discs and spaced from and out of contact with all of the other discs for holding the discs together axially.

VAL CRONSTEDT.

REFERENCES CITED

The following references are of record in the file of this patent:

UNITED STATES PATENTS

| Number | Name | Date |
|---|---|---|
| 1,551,402 | Junggren | Aug. 25, 1925 |
| 2,200,287 | Lysholm | May 14, 1940 |
| 2,308,233 | Schutte | Jan. 12, 1943 |
| 2,384,582 | Wildhaber | Sept. 11, 1945 |
| 2,427,614 | Meier | Sept. 16, 1947 |

FOREIGN PATENTS

| Number | Country | Date |
|---|---|---|
| 74,422 | Austria | May 31, 1913 |
| 492,252 | Germany | Feb. 20, 1930 |